UNITED STATES PATENT OFFICE.

BENJAMIN SADTLER, OF DENVER, COLORADO, ASSIGNOR TO ALBERT G. CLARK, OF CINCINNATI, OHIO.

PROCESS OF PRODUCING RETORTS.

SPECIFICATION forming part of Letters Patent No. 642,723, dated February 6, 1900.

Application filed October 6, 1899. Serial No. 732,827. (No specimens.)

*To all whom it may concern:*

Be it known that I, BENJAMIN SADTLER, of the city of Denver, county of Arapahoe, and State of Colorado, have invented a certain new and useful Process of Producing Retorts and other Articles Adapted to Withstand the Action of Heat and Corroding Agents, of which the following is a specification.

My invention consists in a process for producing retorts and other refractory articles adapted to resist the action of heat, corroding agents, and abrasion.

The especial object of my invention is to produce retorts, the linings for furnaces, and the covering for bricks and other refractory articles adapted for use in the distillation of ores containing such a percentage of zinc as to prevent their economical treatment in ordinary precious-metal-smelting furnaces and such a percentage of oxid of iron or other corrosive bases as to prevent their economical treatment in the retorts of ordinary zinc-distilling furnaces and also to provide such articles for use in other places where refractory materials are required. Valuable quantities of precious metals, such as gold and silver, are often contained in ores of this character; but the iron oxid, &c., excludes their reduction by the means used in zinc distillation, since the iron oxid when exposed to the heat required for such distillation slags with and corrodes the fire-clay of which the retorts are composed, destroying them. If, on the other hand, an effort be made to treat the zinc-bearing ore in the blast-furnace used for the smelting of ores carrying precious metals, the zinc being vaporized and encountering the air-blast is precipitated as a crust upon the walls of the furnace, gradually choking it, obstructing, and finally stopping the operation of the furnace. In consequence of the above-named conditions there are large quantities of such ores containing gold and silver and other metals having both iron oxid and zinc (each valuable, if separated) which it has been impossible to economically work either by zinc distillation or by blast-furnace smelting and which, therefore, have remained as waste. I have discovered that by applying before burning to the interior and exposed surface of the fire-clay retorts commonly used in zinc distillation a smearing or coating of a sintering material, such as a silicate of soda or equivalent substance, and covering the same with a coating of basic material preferably having also on its adjacent surface or mixed with it a small percentage of said sintering material and then subjecting the entire body to a firing in a kiln or zinc-furnace under a heat of such intensity and duration as to fuse the sintering material with the adjacent fire-clay, on the one hand, and basic material, on the other, I can, through the chemical affinity of the sintering material for each of these substances, respectively, so interlock this lining or coating of basic material to the fire-clay body of the retort as to produce a practically-solid cohering retort capable of sustaining the heat to which it is exposed in use and impervious to the oxid of iron or other corroding ingredients of the ores to be treated. The silicate of soda when subjected to the heat above mentioned, in connection with the silicate of alumina of the body of the retort and the basic material with which it is also in contact, forms a chemical union between the fire-clay of the retort, on the one hand, and the magnesia or other basic material composing the lining or coating, on the other hand, thereby sintering together or binding the substances constituting the body and the lining or coating, respectively, and a surface of basic material is produced capable of withstanding the action of the oxids of iron or other chemical agents in the ores at the heat of distillation of the zinc ore and which is also capable of resisting the abrasion from the ores and tools used upon it, to which the surface of such retorts is necessarily exposed. The sintering material serves, further, by its chemical reaction to lock together and give substantial coherence to the basic materials composing the lining or coating. Suppose, for instance, the basic material to be magnesia in the form of calcined magnesite, and a solution of silicate of sodium (which is a thick gummy liquid) is smeared on the inner surface of the fire-clay body. Then, while revolving the circular retort, let this basic material be thrown in the form of a powder into the retort. The silicate of sodium, as the water dries out of it, gums the particles of lining together and also to the retort. There is at this stage no chemical reaction, and while the adherence is sufficient to maintain the particles in proper juxtaposition it is not such as to resist abrasion, and the lining can be readily pushed off, and if allowed to dry would scale off, since these materials make no chemical combination at ordinary temperatures. The retort so prepared is now heated, as before described, to a temperature sufficient to develop the chemical affinity between the sintering material and particles of each of the adjacent materials. Under such heat the silicate of sodium combines with the portion of the fire-clay retort nearest to the lining, forming a thin layer of silicate of sodium and aluminium, which is a definite chemical compound (virtually porcelain) which only softens slightly at high temperatures sufficiently to produce an adherence on the part of the lining. Its presence is usually indicated by a white line. Adhering to this is the lining proper. The chemical reaction in the materials here mentioned is as follows: The exterior of the individual particles of magnesia become converted into a silicate of sodium and magnesium, which at high heat become viscid or semifused, making the exterior of these grains sticky or gummy. They consequently adhere to each other and to the body of the retort, forming a strong and compact lining, the particles of which are bound together by this film of silicate of sodium and magnesium, but the interior of which remains magnesia and is essentially and strongly basic. When these double silicates complete their chemical saturation, they solidify or set. Care should be taken in this operation to limit the amount of silicate of sodium (or other sintering material) used, as the fusibility of compounds of sodium would, if used in too large quantity, produce a condition of fluidity. This fluidity, if carried to excess, would start an intermingling of the basic particles of the lining and the acid particles of the retort, tending to destroy the retort or, at least, its refractory quality. Basic materials having little or no chemical affinity for water are preferable. If the basic lining were applied to the fire-clay retort without this process of sintering the substances together, it would be practically incapable of resisting the abrasions to which such retorts treating such ores are necessarily subjected and would not have the same capacity to resist the action of iron oxids. I prefer to apply the silicate of soda or other substance having the necessary chemical affinity as a wash or thin coating to the inner surface of the dried but unburnt fire-clay of the retort, then allow it to soak in somewhat before applying the basic material, and to mix a small percentage of the sintering material with the basic lining before or when applying it to the surface thus washed or coated; but the essential considerations are to insure the presence of the sintering material on the line of juncture between the fire-clay body and basic lining or coating and the subsequent firing, whereby the desired interpenetration and chemical bond is secured. I prefer to use the basic material pulverized to about the degree of fineness corresponding to a mesh of twenty to an inch and to reject the fine dust which tends to absorb an undue quantity of sintering material. I compose the fire-clay body of the ordinary fire-clay mixture, molding it into the shape of a retort, generally about four feet long and about eight inches internal diameter, and about one inch in thickness. It is then dried, either by the usual air drying process or by the steam process, or by both, before applying the sintering material and the basic lining. I commonly use a coating of sintering material about one thirty-second ($\frac{1}{32}$) of an inch in thickness, which becomes considerably less when the chemical combination takes place as the result of firing. I have found one-eighth of an inch thickness of basic material to give entirely satisfactory results, and have sometimes made it uniform throughout the surface of the retort and sometimes somewhat thicker at the bottom, obtaining satisfactory results in each case. I treat in the same manner the outer top surface of the retorts, since when one of the series of retorts is broken during the operation the hot ore falling upon the retort below would be liable to destroy it, if not thus shielded.

I have found that a heat of about 1,500° Fahrenheit continued for two or three days is desirable for the firing after the materials above mentioned are brought together, and a higher degree of heat or longer time may be used to advantage. Less perfect results may be obtained where less heat is used or the duration of firing shortened. It is desirable to have the basic material at least an eighth of an inch thick. It may be composed of dolomite, magnesia, titanic iron ore, corundum, or other refractory and infusible basic materials, or two or more of such materials mixed. The sintering material should be a small percentage, not more than from ten per cent. to twenty per cent. of the entire lining.

While this process is particularly adapted for use in zinc retorts and other articles adapted to be used in zinc distillation, it is manifest that it may be used for the production-furnaces, fire-brick and other refractory material, in any location where such articles are used without departing from my invention.

I claim—

1. The herein-described process of manufacturing retorts, consisting of applying to the surface of the fire-clay body a sintering material capable of forming under heat a chemical bond with the adjacent fire-clay and also with a basic material, applying to such sintering material a coating or lining of basic material capable of forming under heat a chemical bond therewith, and thereupon sub jecting the composite resultant to heat sufficient to effect a chemical union between such sintering material and adjacent portions of the clay body and between the sintering material and particles of the basic lining, respectively, substantially as and for the purpose described.

2. The herein-described process of manufacturing refractory articles consisting of applying to the surface of the fire-clay body a coating of sintering material, and then a coating of basic material and subjecting the whole to heat sufficient to fuse such sintering material into said body and into the basic lining whereby said body and lining are secured together by a chemical bond, substantially as described.

3. The herein-described process of manufacturing refractory articles consisting of applying to the surface of the fire-clay body a coating of silicate of soda, then a coating of basic material and subjecting the whole to a heat sufficient to fuse said silicate of soda into said body and into said basic lining, whereby body and lining are secured together, substantially as described.

BENJAMIN SADTLER.

Witnesses:
ALBERT G. CLARK,
MARGARET SINCLAIR.

Correction in Letters Patent No. 642,723.

It is hereby certified that in Letters Patent No. 642,723, granted February 6, 1900, upon the application of Benjamin Sadtler, of Denver, Colorado, for an improvement in "Processes of Producing Retorts," an error appears in the printed specification requiring correction as follows: On page 2, line 84, the clause "steam process, or by both, before applying the," should be stricken out and inserted after line 83, same page; and that the said Letters Patent should be read with this correction therein that the same may conform to the record of the case in the Patent Office.

Signed, countersigned, and sealed this 20th day of February, A. D., 1900.

[SEAL.]

THOS. RYAN,
*First Assistant Secretary of the Interior.*

Countersigned:
C. H. DUELL,
*Commissioner of Patents.*